US008180073B1

(12) United States Patent
Grote

(10) Patent No.: US 8,180,073 B1
(45) Date of Patent: May 15, 2012

(54) SYSTEM FOR CREATING AND MANIPULATING DIGITAL MEDIA

(75) Inventor: Mark J. Grote, Louisville, KY (US)

(73) Assignees: Mark J. Grote, Louisville, KY (US); Nicholas L. Jumblatt, Louisville, KY (US)

( * ) Notice: Subject to any disclaimer, the term of this patent is extended or adjusted under 35 U.S.C. 154(b) by 565 days.

(21) Appl. No.: 12/366,867

(22) Filed: Feb. 6, 2009

Related U.S. Application Data

(60) Provisional application No. 61/027,394, filed on Feb. 8, 2008.

(51) Int. Cl.
*G10H 7/00* (2006.01)
*G09G 3/00* (2006.01)
*G06F 3/041* (2006.01)

(52) U.S. Cl. .............. 381/119; 84/625; 84/660; 84/697; 178/19.03; 345/179; 700/94; 715/716

(58) Field of Classification Search .................. 715/716, 715/717; 345/173–183; 84/625, 660, 697; 381/119; 178/19.01–19.05
See application file for complete search history.

(56) References Cited

U.S. PATENT DOCUMENTS

| | | | | |
|---|---|---|---|---|
| 6,933,928 | B1 * | 8/2005 | Lilienthal | 345/173 |
| 7,087,830 | B2 * | 8/2006 | Kent et al. | 84/645 |
| 7,133,531 | B2 * | 11/2006 | Karpenstein | 381/119 |
| 7,812,268 | B2 * | 10/2010 | Ely | 178/18.03 |
| 2005/0259532 | A1 * | 11/2005 | Roman et al. | 369/47.1 |
| 2006/0022956 | A1 * | 2/2006 | Lengeling et al. | 345/173 |
| 2007/0280489 | A1 * | 12/2007 | Roman et al. | 381/119 |
| 2008/0156546 | A1 * | 7/2008 | Hauck | 178/19.01 |

OTHER PUBLICATIONS

Korg, Korg Kaossilater Dynamic Phrase Synthesizer, product information available at http://www.korgkaossilator.com, downloaded Apr. 13, 2009.

Wacom, Introducing intuos.4 Professional Pen Tablet, product information available at http://www.wacom.com/intuos/, downloaded Apr. 13, 2009.

Wacom, Input Technology, portable device product information available at http://www.wacom-components.com/english/technology/mobile.html, downloaded Apr. 13, 2009.

Station Street, Mason VX-206 Wireless Guitar Belt-Pack Transmitter product information available at http://www.stationstreet.ca/zoomimages.asp?id=9374&name=Mason+VX%2D206+VHF+Wireless+Guitar+Transmitter+System&pid=230, downloaded Apr. 23, 2009.

A2Z Cables.com, Audio Adapter-Din5 Male/(4) RCA Female (MIDI Adapter) product information available at http://store.a2zcable.com/avb57.html, downloaded Apr. 23, 2009.

Samson Wireless, Airline Guitar—Wireless System product information, available at http://www.samsontech.com/products/productpage.cfm?prodID=145, downloaded Apr. 23, 2009.

Wacom, nextbeat product information available at http://www.nextbeat.net/product_tour.html, downloaded Apr. 23, 2009.

* cited by examiner

*Primary Examiner* — Zandra Smith
*Assistant Examiner* — Eric Ward
(74) *Attorney, Agent, or Firm* — Stites & Harbison PLLC; Jeffrey A. Haeberlin

(57) ABSTRACT

A system for creating and manipulating digital media integrates a graphics tablet, a touchpad, and a synthesizer chipset. The graphics tablet includes a tablet surface, a grid of wires located under the tablet surface, and a graphics tablet chipset. The graphics tablet chipset includes an interface operably connected to the grid of wires for sending power to a stylus when the stylus is positioned over the tablet surface and receiving a signal from the stylus used to determine a position of the stylus with respect to the tablet surface. The touchpad is positioned on the tablet surface such that the touchpad also detects the position of the stylus simultaneously with the graphics tablet. The synthesizer chipset creates digital sounds based on input from the touchpad. The position of the stylus is output to a graphics tablet chipset output, and the digital sounds are output to a synthesizer chipset sound output.

16 Claims, 6 Drawing Sheets

SYSTEM FOR CREATING AND MANIPULATING DIGITAL MEDIA

CROSS-REFERENCE TO RELATED APPLICATIONS

This application claims the benefit of U.S. Provisional Patent Application No. 61/027,394, filed Feb. 8, 2008, the entire disclosure of which is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The field of the disclosure relates generally to creating and manipulating digital media, including a system for creating electronic sounds and visual art by a performance DJ.

2. Background Art

A performance disc jockey (DJ) is a collagist of sounds in a live performance setting, typically utilizing a plurality of electronic sound sources. For instance, as shown in FIG. 1, a typical system 100 for creating and manipulating digital media, such as electronic sound and visual art, may include a first synthesizer 102 and a second synthesizer 104 interfaced to a mixing device 106. Each of the first synthesizer 102 and the second synthesizer 104 may have an on/standby switch 108*a*, 108*b*, a touchpad 110*a*, 110*b* serving as an input device to a synthesizer chipset, a program/value selector knob 112*a*, 112*b* and a corresponding program/value display 114*a*, 114*b*, various synthesizer function buttons 116*a*, 116*b*, and audio outputs 118*a*, 118*b*. An output of the mixing device 106 may be communicated to an input of a computer 120 running a sound manipulation software program. The sound manipulation software program may be for further manipulating highs, mid-ranges, lows, or gain of sound produced by the first synthesizer 102 and/or the second synthesizer 104, or combining the sound with samples or pieces of other recorded music. An output of the computer 120 may then be input to an audio system 122, such as a loudspeaker system of a club.

Additionally, some performance DJs or performance artists may utilize a stylus 123 and a graphics tablet 124 interfaced to a computer 126 running a drawing software program and output to a video display device 128, such as a projector, for producing live interpretive drawings during a performance.

However, as is readily apparent from FIG. 1, the first synthesizer 102, the second synthesizer 104, the mixer 106, the computer 120 running the sound manipulation software program, the stylus 123, the graphics tablet 124, and the computer 126 running the drawing software program not only require considerable coordination to set up and operate, but also requires considerable physical space.

Additionally, a performance DJ may also wish to have other electronic sound sources, such as a turntable or a drum machine, attached to the mixing device 106 via additional sound channels. The performance DJ (or DJs) may simply not have enough hands to simultaneously control all of the electronic sound sources, the computer 120 running the sound manipulation software program, and/or the stylus 123, graphics tablet 124, and computer 126 running the drawing software program.

BRIEF SUMMARY OF THE INVENTION

According to a first aspect of the invention, a system for creating and manipulating digital media includes: a graphics tablet, a touchpad, and a synthesizer chipset. The graphics tablet includes a tablet surface, a grid of wires located under the tablet surface, and a graphics tablet chipset. The graphics tablet chipset includes: a graphics tablet chipset interface operably connected to the grid of wires for sending power to a stylus when the stylus is positioned over the tablet surface and receiving a signal from the stylus; and a graphics tablet chipset output. The graphics tablet chipset determines a position of the stylus with respect to the tablet surface using the graphics tablet chipset interface, and outputs the position of the stylus to the graphics tablet chipset output. The touchpad is positioned on the tablet surface such that the touchpad detects the position of the stylus simultaneously with the determination of the position of the stylus by the graphics tablet chipset. The synthesizer chipset includes: a synthesizer chipset input in communication with the touchpad; and a synthesizer chipset sound output. The synthesizer chipset creates digital sounds based on input from the touchpad via the synthesizer chipset input, and outputs the digital sounds to the synthesizer chipset sound output.

In accord with one implementation, the system further includes a housing containing the graphics tablet, the touchpad and the synthesizer chipset in a unitary assembly. The system may further include: a program/value input device integral with the housing; a program/value display device integral with the housing; and a loop function input device integral with the housing. The synthesizer chipset further includes: a program/value input in communication with the program/value input device, for receiving a selection of one of a plurality of synthesized sound programs for creating the digital sounds; a program/value display output in communication with the program/value display device, for displaying an indication of the selection of one of the plurality of synthesized sound programs; and a loop function input in communication with the loop function input device for receiving an instruction to stack sound phrases from at least two of the plurality of synthesized sound programs. The system may still further include a strap having a first end and a second end, the first end and the second end attached to the housing so that the housing can be supported by a body of a user when creating the digital sounds.

In accord with another implementation, the stylus further has an integral loop function input device, and the synthesizer chipset further includes a loop function input in communication with the loop function input device for receiving an instruction to stack sound phrases from at least two of a plurality of synthesized sound programs.

In accord with yet another implementation, the system further includes a computer having a graphical user interface (GUI). The GUI is in communication with the graphics tablet chipset output for receiving the position of the stylus from the graphics tablet chipset.

The computer may have a sound input in communication with the synthesizer chipset output for receiving the digital sounds from the synthesizer chipset. Further, the computer may execute a sound manipulation software program for manipulating the digital sounds to produce manipulated digital sounds. In this configuration, the computer has a sound output for outputting the manipulated digital sounds.

In another implementation, the computer may execute a drawing software program for creating a visual image using the position of the stylus from the graphics tablet chipset as an input to the drawing software program. In this configuration, the computer further has a video output for outputting the visual image.

In yet another implementation, the computer has a sound input in communication with the synthesizer chipset output for receiving the digital sounds from the synthesizer chipset, and executes a sound manipulation software program and a drawing software program. The sound manipulation software program is for manipulating the digital sounds to produce manipulated digital sounds. The computer further has a sound output for outputting the manipulated digital sounds. The drawing software program is for: creating a visual image using the position of the stylus from the graphics tablet chipset as an input to the drawing software program; and influencing characteristics of the visual image using the digital sounds from the synthesizer chipset. The computer further has a video output for outputting the visual image.

In accord with another aspect of the invention, a system for creating and manipulating digital media, includes: a graphics table, a touchpad, a switch, a first synthesizer chipset, a second synthesizer chipset, and an audio mixer. The graphics tablet includes a tablet surface, a grid of wires located under the tablet surface, and a graphics tablet chipset. The graphics tablet chipset includes: a graphics tablet chipset interface operably connected to the grid of wires for sending power to a stylus when the stylus is positioned over the tablet surface and receiving a signal from the stylus; and a graphics tablet chipset output. The graphics tablet chipset determines a position of the stylus with respect to the tablet surface using the graphics tablet chipset interface, and outputs the position of the stylus to the graphics tablet chipset output. The touchpad is positioned on the tablet surface such that the touchpad also detects the position of the stylus simultaneous with the graphics tablet. The switch is interfaced to the touchpad for switching the touchpad between a first touchpad interface, a second touchpad interface, and a standby position. The first synthesizer chipset includes: a first synthesizer chipset input in communication with the first touchpad interface; and a first synthesizer chipset sound output. The second synthesizer chipset includes: a second synthesizer chipset input in communication with the second touchpad interface; and a second synthesizer chipset sound output. The first synthesizer chipset and the second synthesizer chipset create first synthesizer digital sounds and second synthesizer digital sounds, respectively, based on input from the touchpad via the first synthesizer chipset input and the second synthesizer chipset input, respectively, and output the first synthesizer digital sounds and the second synthesizer digital sounds to the first synthesizer chipset sound output and the second synthesizer chipset sound output, respectively. The audio mixer includes: a first channel input to a first channel in communication with the first synthesizer chipset sound output; a second channel input to a second channel in communication with the second synthesizer chipset sound output; a mixing control; and an audio mixer output. The audio mixer mixes the first synthesizer digital sounds and the second synthesizer digital sounds via the mixing control to produce mixed digital sounds, and outputs the mixed digital sounds to the audio mixer output.

In accord with one implementation, the system further includes a housing containing the graphics tablet, the touchpad, the switch, the first synthesizer chipset, the second synthesizer chipset, and the audio mixer in a unitary assembly. This implementation may further include: a first program/value input device being integral with the housing; a first program/value display device being integral with the housing; a first loop function input device being integral with the housing; a second program/value input device being integral with the housing; a second program/value display device being integral with the housing; and a second loop function input device being integral with the housing. The first synthesizer chipset further includes: a first program/value input in communication with the first program/value input device, for receiving a selection of one of a plurality of synthesized sound programs of the first synthesizer chipset for creating the first synthesizer digital sounds; a first program/value display output in communication with the first program/value display device, for displaying an indication of the selection of one of the plurality of synthesized sound programs of the first synthesizer chipset; and a first loop function input in communication with the first loop function input device for receiving an instruction to stack sound phrases from at least two of the plurality of synthesized sound programs of the first synthesizer chipset. The second synthesizer chipset further includes: a second program/value input in communication with the second program/value input device, for receiving a selection of one of a plurality of synthesized sound programs of the second synthesizer chipset for creating the second synthesizer digital sounds; a second program/value display output in communication with the second program/value display device, for displaying an indication of the selection of one of the plurality of synthesized sound programs of the second synthesizer chipset; and a second loop function input in communication with the second loop function input device for receiving an instruction to stack sound phrases from at least two of the plurality of synthesized sound programs of the second synthesizer chipset. The system may further include a strap having a first end and a second end, the first end and the second end attached to the housing so that the housing can be supported by a body of a user.

In accord with another implementation, the system further includes a computer having a graphical user interface (GUI). The computer is in communication with the graphics tablet chipset output, and receives the position of the stylus from the graphics tablet chipset as an input to the GUI.

The computer may have a sound input in communication with the audio mixer output for receiving the mixed digital sounds from the audio mixer output. Further, the computer may execute a sound manipulation software program for manipulating the mixed digital sounds to produce manipulated digital sounds, and may further have a sound output for outputting the manipulated digital sounds.

In another implementation, the computer executes a drawing software program for creating a visual image using the position of the stylus from the graphics tablet chipset as an input to the drawing software program, and has a video output for outputting the visual image.

In yet another implementation, the computer has a sound input in communication with the audio mixer output for receiving the mixed digital sounds from the audio mixer output, executes a sound manipulation software program for manipulating the mixed digital sounds to produce manipulated digital sounds, and further has a sound output for outputting the manipulated digital sounds. Additionally, the computer executes a drawing software program for: creating a visual image using the position of the stylus from the graphics tablet chipset as an input to the drawing software program; and influencing characteristics of the visual image using the mixed digital sounds from the audio mixer output. The computer further has a video output for outputting the visual image.

In still yet another implementation, the stylus further comprises a first integral loop function input device and a second integral loop function input device. The first synthesizer chipset further includes a first loop function input in communication with the first integral loop function input device for receiving an instruction to stack sound phrases from at least two of a plurality of synthesized sound programs of the first synthesizer chipset. The second synthesizer chipset further includes a second loop function input in communication with the second integral loop function input device for receiving an instruction to stack sound phrases from at least two of a plurality of synthesized sound programs of the second synthesizer chipset.

Other features and advantages of the invention will be set forth in, or apparent from, the detailed description of exemplary embodiments of the invention found below.

BRIEF DESCRIPTION OF THE SEVERAL VIEWS OF THE DRAWINGS

Exemplary embodiments of the invention will hereafter be described with reference to the accompanying drawings, wherein like numerals denote like elements.

DETAILED DESCRIPTION OF EXEMPLARY EMBODIMENTS OF THE INVENTION

Figure 1:
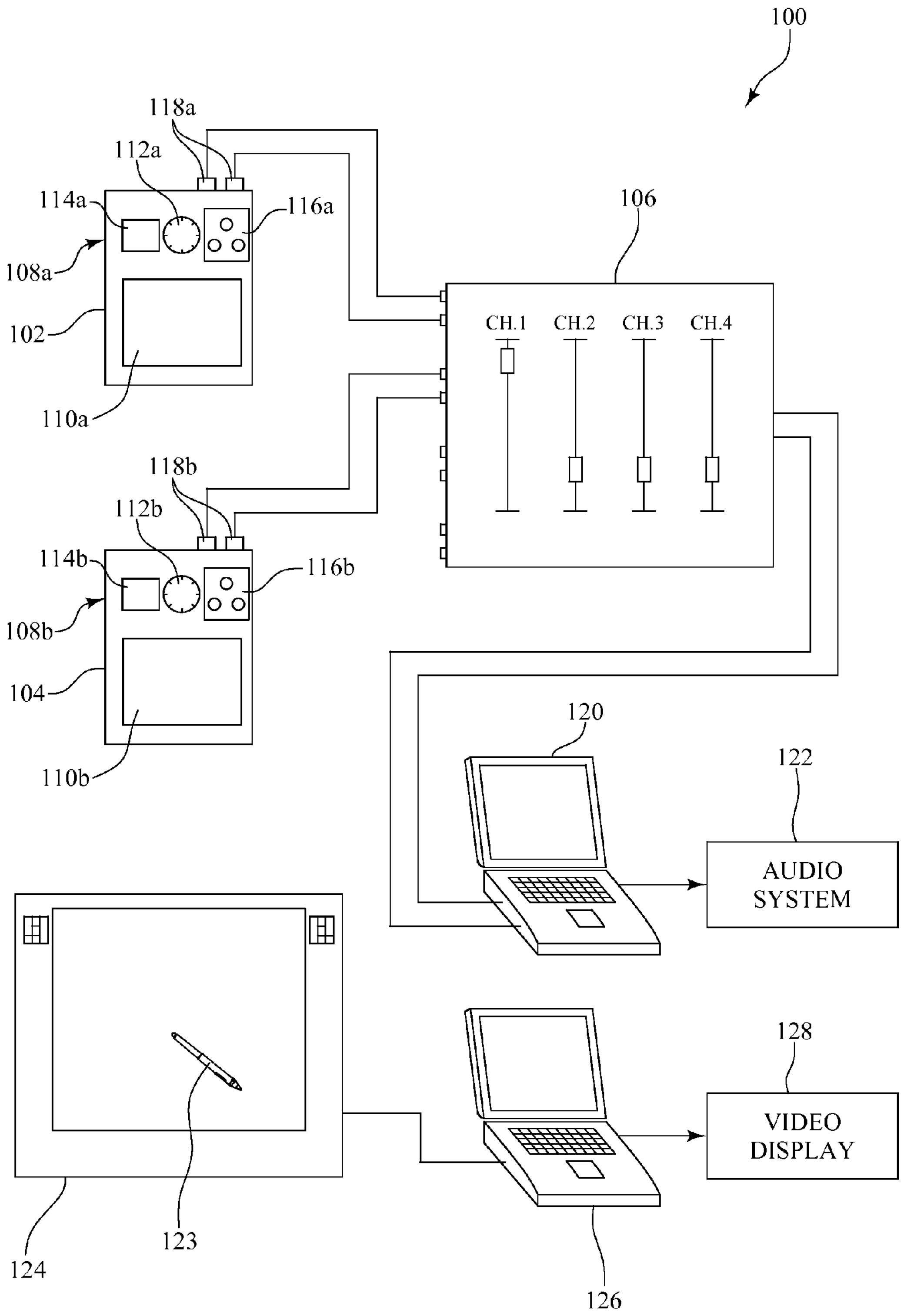
FIG. 1 (Prior Art)
FIG. 1 is a system diagram of a prior art system for creating and manipulating digital media.
Figure 2:
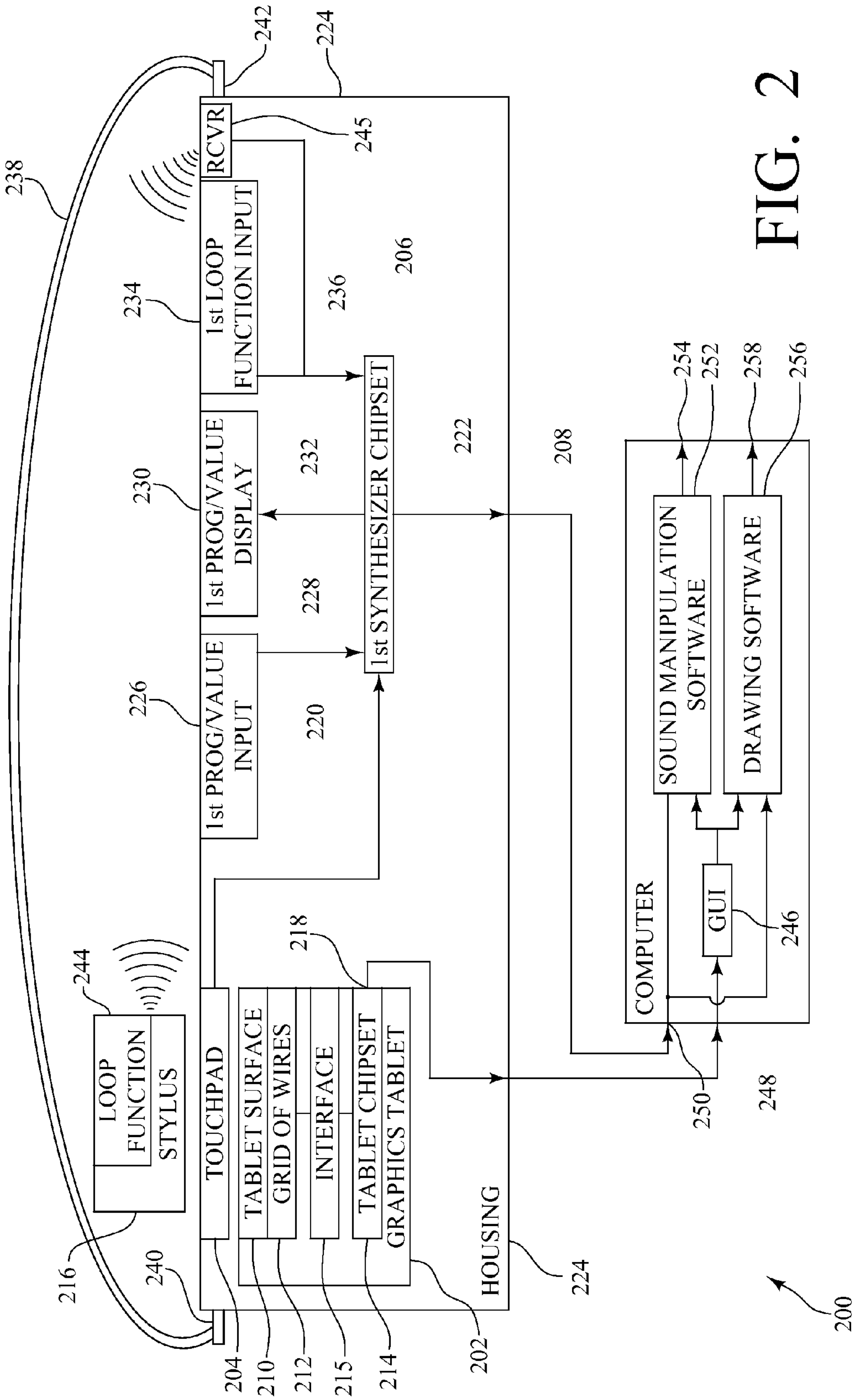
FIG. 2 is a functional block diagram of a first exemplary system for creating and manipulating digital media according to the invention.

FIG. 2 shows a first exemplary system 200 for creating and manipulating digital media, including a graphics tablet 202, a touchpad 204, a synthesizer chipset 206 and a computer 208.

The graphics tablet 202 includes a tablet surface 210, a grid of wires 212 located under the tablet surface 210, and a graphics tablet chipset 214. The graphics tablet chipset 214 includes a graphics tablet chipset interface 215 operably connected to the grid of wires 212 for sending power to a stylus 216 when the stylus 216 is positioned over the tablet surface 210, and receiving a signal from the stylus 216. The graphics tablet chipset 214 also includes a graphics tablet chipset output 218. The graphics tablet chipset 214 determines a position of the stylus 216 with respect to the tablet surface 210 using the graphics tablet chipset interface and the grid of wires 212, and outputs the position of the stylus 216 to the graphics tablet chipset output 218. An example of such a graphics tablet 202 is an Intuos model tablet, manufactured by Wacom Co., Ltd. Such a graphics tablet 202 provides power to the stylus 216 through resonant coupling, and thus, no batteries or cord are required for the stylus 216. The grid of wires 212 stimulates oscillation in a coil-and-capacitor circuit in the stylus 216. Then, the energy of the oscillations in the resonant circuit of the stylus 216 is detected by the grid of wires 212. This information is analyzed by the tablet chipset 214 to determine the position of the stylus 216. In addition, the stylus 216 may communicate other information, such as pressure-sensitivity, side-switch status, tip or eraser orientation, and tool identification.

The touchpad 204 is positioned on the tablet surface 210 such that the touchpad 204 also detects the position of the stylus 216 simultaneously with the graphics tablet 202. The touchpad 204 is a pointing device consisting of a specialized surface that can translate the motion and position of the stylus 216 or a user's finger to a relative position. Such a touchpad 204 may operate in several ways, including capacitance and conductance sensing. For instance, in one implementation, a series of conductors are arranged in an array of parallel lines in two layers, separated by an insulator and crossing each other at right angles to form a grid. A signal, such as a high frequency signal, is applied sequentially between the ends of each layer in the two-dimensional grid array. This implementation also functions using thin conducting layers, such as layers of carbon graphite (e.g., pencil lead), across which the signals are applied orthogonally to each other.

It is noted that the graphics tablet 202 and the touchpad 204 may be transparent or translucent and used in conjunction with a video display (not shown), such as an LCD screen, positioned beneath the graphics tablet 202 such that a user is able to see and respond to images displayed on the video display. Such a configuration is considered to be within the spirit and scope of the invention as described and claimed herein.

The synthesizer chipset 206 includes a synthesizer chipset input 220 and a synthesizer chipset output 222. The synthesizer chipset 206 creates digital sounds (i.e., dynamic sound phrases) based on input from the touchpad 204 via the synthesizer chipset input 220, and outputs the digital sounds to the synthesizer chipset output 222. An example of such a synthesizer chipset 206 is a chipset found in a Kaossilator model dynamic phrase synthesizer, manufactured by Korg Inc. Such a synthesizer chipset 206 creates dynamic sound phrases based on input from an X-Y touchpad, such as a user tapping or sliding a finger across the touchpad 204 described above. Advantageously, synthesizer chipset 206 creates dynamic sound phrases based on a user tapping or sliding the stylus 216 across the touchpad 204. The chipset of the Kaossilator model dynamic phrase synthesizer features 100 synthesized sounds, including acoustic (guitar, trumpet, piano), percussion, and electronic sounds, 10 drum patterns, 31 musical patterns, 50 types of gated arpeggiators, and a ±12 key range. The gate arpeggiators and a loop function allow layering of instruments to produce loops.

The first exemplary system 200 also includes a housing 224 that contains the graphics tablet 202, the touchpad 204, and the synthesizer chipset 206 in a unitary assembly. For example, a housing of an Intuos model tablet may be modified to contain not only the components of the graphics tablet 202, but also the touchpad 204 and the synthesizer chipset 206 described above. Alternatively, a separate housing 224 may be fabricated to contain the graphics tablet 202, the touchpad 204 and the synthesizer chipset 206.

The first exemplary system 200 further includes a program/value input device 226 integral with the housing 224. The program/value input device 226 may be a knob or dial. The synthesizer chipset 206 includes a program/value input 228 in communication with the program/value input device 226, for receiving a selection of one of a plurality of synthesized sound programs for creating the digital sounds.

The first exemplary system 200 also includes a program/value display device 230, such as an LED display, also integral with the housing 224. The synthesizer chipset 206 further includes a program/value display output 232 in communication with the program/value display device 230, for displaying an indication of a selection of one of the plurality of synthesized sound programs.

The first exemplary system 200 still further includes a loop function input device 234, such as a momentary contact switch, a push-button or the like, also integral with the housing 224. The synthesizer chipset 206 further includes a loop function input 236 in communication with the loop function input device 234 for receiving an instruction to stack sound phrases from at least two of the plurality of synthesized sound programs.

Further still, the first exemplary system 200 includes a strap 238 having a first end 240 and a second end 242. The first end 240 and the second end 242 are attached to the housing 224 so that the housing can be supported by a body of a user when creating the digital sounds. Thus, the housing 224 along with the graphics tablet 202, the touchpad 204, the synthesizer chipset 206, the program/value input device 226, the program/value display device 230, and the loop function input device 234 may be worn by the user, such as a performance DJ, as a musical instrument, similar to a guitar or the like.

The stylus 216 further has an integral loop function input device 244, such as a momentary contact switch, push-button, or the like, which is in communication with the loop function input 236 of the synthesizer chipset 206 through a wireless receiver 245.

The computer 208 includes a graphical user interface (GUI) 246. The GUI 246 is in communication with the graphics tablet chipset output 218 for receiving the position of the stylus 216 from the graphics tablet chipset 214. Thus, the stylus 216 and graphics tablet 202 serve as an input to the GUI 246 for operation of the computer 208, such as the selection and manipulation of icons, menu items, and software. The computer 208 may have a GUI input 248 in the form of a USB, Bluetooth, or Wireless USB connection or the like, to facilitate the communication between the graphics tablet 202 and the computer 208.

The computer 208 also has a sound input 250 in communication with the synthesizer chipset output 222 for receiving the digital sounds from the synthesizer chipset 206. Such communication may be by a wired or a wireless connection. Additionally, the computer 208 includes and executes a sound manipulation software program 252 for manipulating the digital sounds to produce manipulated digital sounds. An example of such a sound manipulation software program is FL Studio, formerly known as Fruity Loops, a digital audio work station developed by Image-Line software. Advantageously, the stylus 216 and graphics tablet 202 may be used via the GUI 246 as an input device for the sound manipulation software program 252. The computer 208 also has a sound output 254 for outputting the manipulated digital sounds to, for instance, a loud speaker system of a club. The sound manipulation software program 252 may be further for manipulating highs, midranges, lows, or gain, of the digital sounds, or combining the sounds with samples or pieces of other recorded music.

Additionally, the computer 208 executes a drawing software program 256 for creating a visual image using the position of the stylus 216 from the graphics tablet 202 via the GUI 246. Further, the drawing software program 256 may utilize the digital sounds from the synthesizer chipset 206 via the sound input 250 for influencing the characteristics of the visual image. The computer 208 further has a video output 258 for outputting the visual image. Thus, a performance DJ can utilize the first exemplary system 200 for creating visual images representing an interpretation of the digital sounds, and when drawing shapes, the digital sounds can be used to affect the characteristics of the shapes. For example, a shape, such as a line, can be oscillated during the drawing process based on the frequency of the digital sounds.

Thus, the graphics tablet 202, touchpad 204, synthesizer chipset 206 and computer 208 comprise a first exemplary system 200 for creating and manipulating digital media, such as digital sounds and a visual image.

Figure 3:
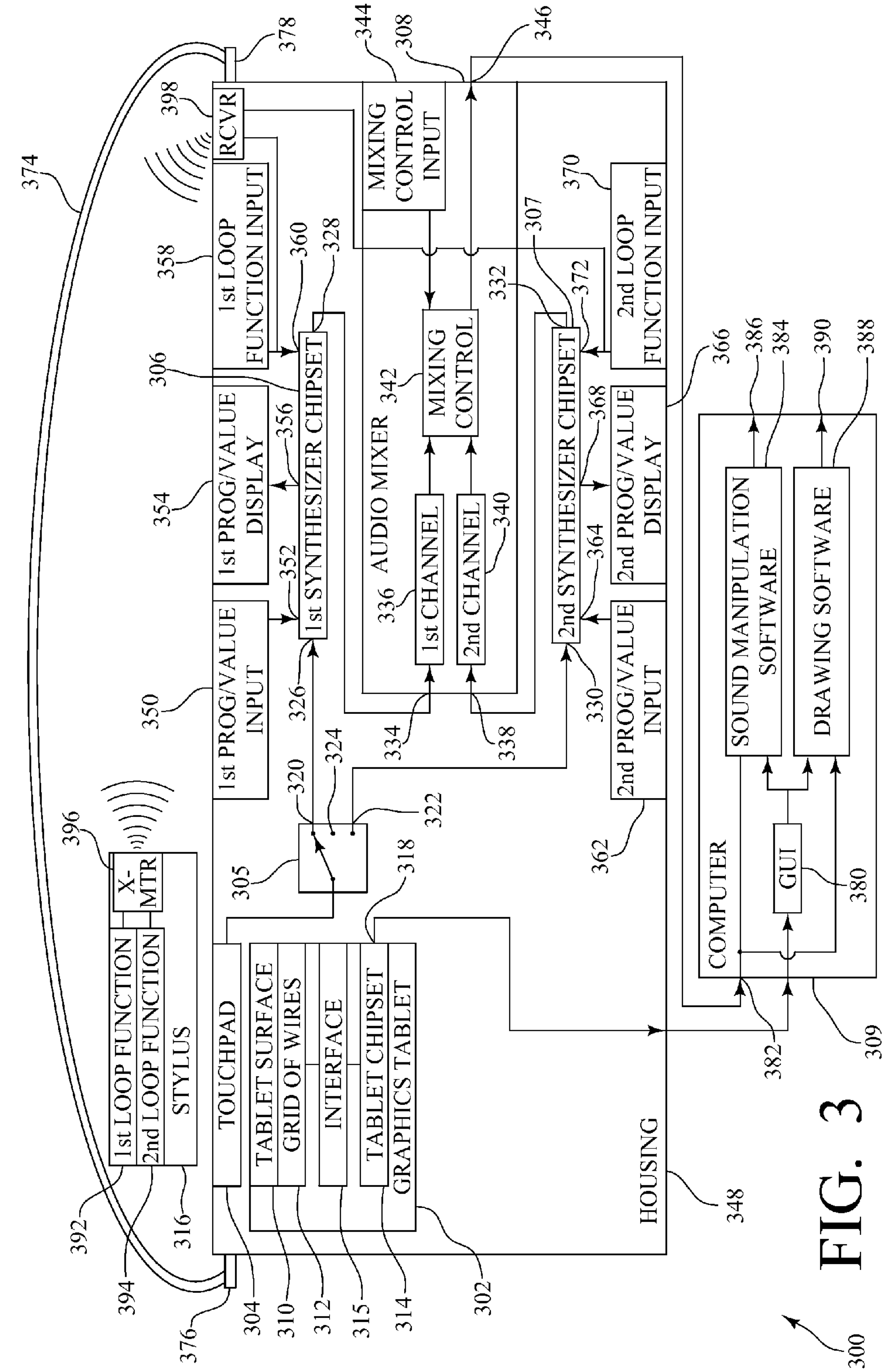
FIG. 3 is a functional block diagram of a second exemplary system for creating and manipulating digital media according to the invention

FIG. 3 shows a second exemplary system 300 for creating and manipulating digital media, including a graphics tablet 302, a touchpad 304, a switch 305, a first synthesizer chipset 306, a second synthesizer chipset 307, an audio mixer 308, and a computer 309.

As in the first exemplary system 200 (FIG. 2), the graphics tablet 302 of the second exemplary system 300 includes a tablet surface 310, a grid of wires 312 located under the tablet surface 310, and a graphics tablet chipset 314. The graphics tablet chipset 314 includes a graphics tablet chipset interface 315 operably connected to the grid of wires 312 for sending power to a stylus 316 when the stylus 316 is positioned over the tablet surface 310, and receiving a signal from the stylus 316. The graphics tablet chipset 314 includes a graphics tablet chipset output 318. The graphics tablet chipset 314 determines a position of the stylus 316 with respect to the tablet surface 310 using the graphics tablet chipset interface 315 and a grid of wires 312, and outputs the position of the stylus 316 to the graphics tablet chipset output 318.

The touchpad 304 is positioned on the tablet surface 310 such that the touchpad 304 also detects the position of the stylus 316 simultaneously with the graphics tablet 302.

The switch 305 is interfaced to the touchpad 304 for switching the touchpad 304 between a first touchpad interface 320, a second touchpad interface 322, and a standby position 324. As shown, the switch 305 is a three position switch. However, as described hereinafter, the switch 305 could consist of two stages of two position switches, wherein the first stage switches the touchpad 304 between connection to the second stage or the standby position 324, and wherein the second stage switches between the first touchpad interface 320 and the second touchpad interface 322.

The first synthesizer chipset 306 includes a first synthesizer chipset input 326 and a first synthesizer chipset sound output 328. The first synthesizer chipset input 326 is in communication with the first touchpad interface 320.

The second synthesizer chipset 307 includes a second synthesizer chipset input 330 and a second synthesizer chipset sound output 332. The second synthesizer chipset input 330 is in communication with the second touchpad interface 322.

The first synthesizer chipset 306 and the second synthesizer chipset 307 create first synthesizer digital sounds and second synthesizer digital sounds, respectively, based on input from the touchpad 304 via the switch 305 to the first synthesizer chipset input 326 and the second synthesizer chipset input 330, respectively. The first synthesizer digital sounds and the second synthesizer digital sounds are output to the first synthesizer chipset sound output 328 and the second synthesizer chipset sound output 332, respectively. Thus, it is possible to use the touchpad 304 connected to the first synthesizer chipset 306 through the switch 305 to establish the first synthesizer digital sounds, then switch the touchpad 304 using the switch 305 to the second touchpad interface 322 to be in communication with the second synthesizer chipset input 330 to establish the second synthesizer digital sounds. It is also possible to switch the touchpad 304 to the standby position such that the touchpad 304 is not in communication with either the first synthesizer chipset 306 or the second synthesizer chipset 307. Thus, the graphics tablet 302 can be used without the touchpad 304 providing input to either the first synthesizer chipset 306 or the second synthesizer chipset 307.

The audio mixer 308 includes a first channel input 334 to a first channel 336, which is in communication with the first synthesizer chipset output 328, a second channel input 338 to a second channel 340, which is in communication with the second synthesizer chipset sound output 332, a mixing control 342, a mixing control input 344, and an audio mixer output 346. The mixing control input 344 and the mixing control 342 may include various sliders, switches and knobs, and related components for mixing, fading and manipulating sounds via the first channel 336 and the second channel 340 as is known in the art. The audio mixer 308 mixes the first synthesizer digital sounds and the second synthesizer digital sounds via the mixing control 342 and mixing control input 344 to produce mixed digital sounds, and outputs the mixed digital sounds to the audio mixer output 346. Additional audio channels and mixing control inputs may be provided to allow the audio mixer 308 to mix sounds from other external sources that may be connected to the second exemplary system 300. Additionally, the audio mixer 308 may include a headphone interface (not shown) for allowing the user to cue-in the various audio channels.

The second exemplary system 300 further includes a housing 348 containing the graphics tablet 302, the touchpad 304, the switch 305, the first synthesizer chipset 306, the second synthesizer chipset 307, and the audio mixer 308 in a unitary assembly.

The second exemplary system 300 further includes a first program/value input device 350 integral with the housing 348. The first synthesizer chipset 306 includes a first program/value input 352 in communication with the first program/value input device 350, for receiving a selection of one of a plurality of synthesized sound programs of the first synthesizer chipset 306 for creating the first synthesizer digital sounds.

The second exemplary system 300 also includes a first program/value display device 354 integral with the housing 348. The first synthesizer chipset 306 further includes a first program/value display output 356 in communication with the first program/value output device 354, for displaying an indication of a selection of one of the plurality of synthesized sound programs.

The second exemplary system 300 still further includes a first loop function input device 358 also integral with the housing 348. The first synthesizer chipset 306 further includes a first loop function input 360 in communication with the first loop function input device 358 for receiving an instruction to stack sound phrases from at least two of the plurality of synthesized sound programs of the first synthesizer chipset 306.

The second exemplary system 300 still further includes a second program/value input device 362 integral with the housing 348. The second synthesizer chipset 307 includes a second program/value input 364 in communication with the second program/value input device 362, for receiving a selection of one of a plurality of synthesized sound programs for creating the second synthesizer digital sounds.

The second exemplary system 300 also includes a second program/value display device 366 integral with the housing 348. The second synthesizer chipset 307 further includes a second program/value display output 368 in communication with the second program/value display device 366, for displaying an indication of a selection of one the plurality of synthesized sound programs of the second synthesizer chipset 307.

The second exemplary system 300 still further includes a second loop function input device 370 also integral with the housing 348. The second synthesizer chipset 307 further includes a second loop function input 372 in communication with the second loop function input device 370, for receiving an instruction to stack sound phrases from at least two of the plurality of synthesized sound programs of the second synthesizer chipset 307.

Further still, the second exemplary system 300 includes a strap 374 having a first end 376 and a second end 378. The first end 376 and the second end 378 are attached to the housing 348 so that the housing can be supported by a body of a user.

The computer 309 includes a GUI 380. The GUI 380 is in communication with the graphics tablet chipset output 318 for receiving the position of the stylus 316 from the graphics tablet chipset 314.

The computer 309 also has a sound input 382 in communication with the audio mixer output 346 for receiving the mixed digital sounds from the audio mixer output 346. Additionally, the computer 309 executes a sound manipulation software program for manipulating the mixed digital sounds to product manipulated digital sounds. The computer 309 also has a sound output 386 for outputting the manipulated digital sounds.

Additionally, the computer 309 executes a drawing software program 388 for creating a visual image using the position of the stylus 316 from the graphics tablet 302 via the GUI 380. Further, the drawing software program 388 may utilize the mixed digital sounds from the audio mixer output 346 to influence characteristics of the visual image. The computer 309 further has a video output 390 for outputting the visual image.

The stylus 316 further has first integral loop function input device 392, such as a momentary contact switch, push-button, or the like, and a second integral loop function input device 394 which are in communication with the first loop function input 360 of the first synthesizer chipset 306 and the second loop function input 372 of the second synthesizer chipset 307, respectively, via a wireless transmitter 396 in the stylus 316 and a wireless receiver 398 integral with the housing 348.

Figure 4:
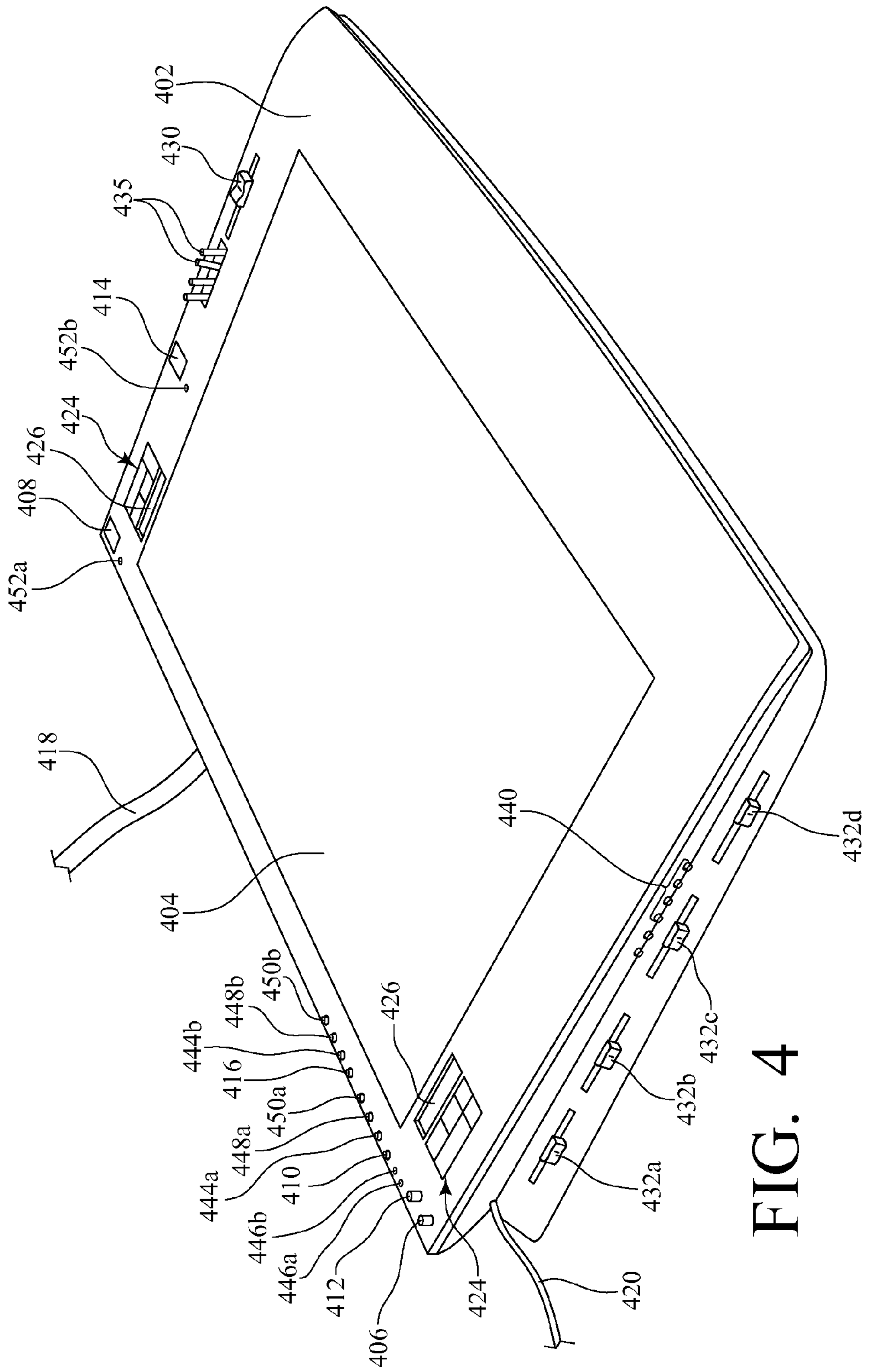
FIG. 4 is a perspective view of an exemplary embodiment of a housing of the invention, the housing containing a graphics tablet, a touchpad, a switch, a first synthesizer chipset, a second synthesizer chipset, and an audio mixer in a unitary assembly.
Figure 5:
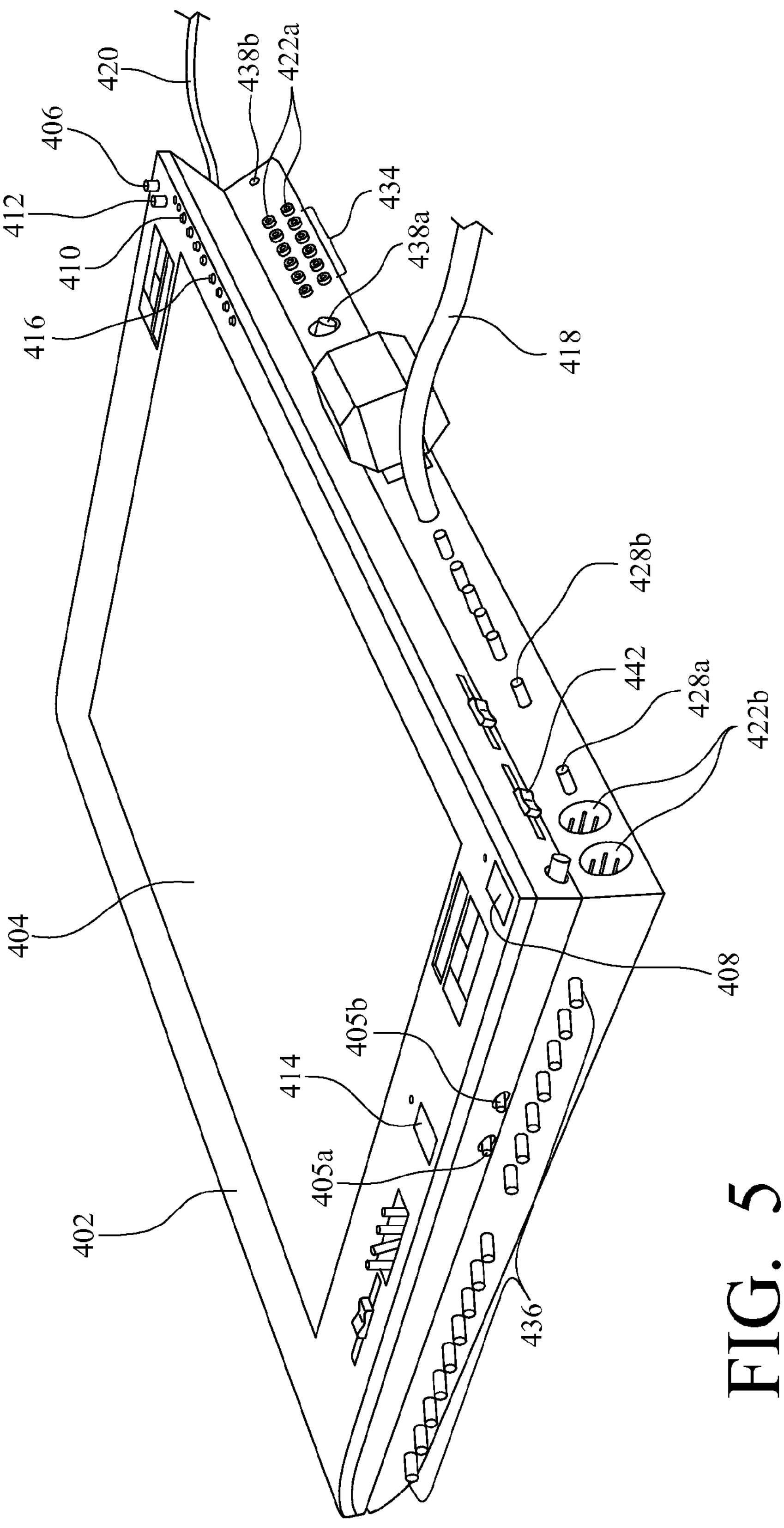
FIG. 5 is another perspective view of the exemplary embodiment of FIG. 4, viewed from a different perspective.

FIG. 4 and FIG. 5 are perspective views of an exemplary housing 402 where a touchpad 404, a first switch 405*a*, a second switch 405*b*, a first program/value input device 406, a first program/value display device 408, a first loop function input device 410, a second program/value input device 412, a second program/value display device 414, and a second loop function input device 416 are visible. Also visible is a power cord 418. Still further, a USB cable 420 is shown for providing communication between a graphics tablet chipset output (not visible) and a GUI of a computer (not shown). Also shown are a number of mixing controls, as described in more detail below, a light-duty audio mixer output 422*a*, and a heavy-duty audio mixer output 422*b*. Still further shown are programmable hot keys 424 and a touch-sensitive slider control 426 for use with the graphics tablet (not visible but located under the touchpad 404).

The first switch 405*a* functions to connect the touchpad 404 to the second switch 405*b*, or to completely disconnect the touchpad 404. Assuming the first switch 405*a* is set to connect the touchpad 404 to the second switch 405*b*, the second switch 405*b* functions to connect the touchpad 404 to either a first synthesizer chipset (not visible) or a second synthesizer chipset (not visible), as described above.

With respect to the mixing controls, shown are: master cross-fader channel selection switches 428*a*, 428*b*; master cross-fader 430; master volume controls for each channel 432*a*, 432*b*, 432*c*, 432*d*; external inputs 434 for a third channel and a fourth channel; selector switches 435 for the third and fourth channels; and low-mid-high-gain control knobs 436. Additionally shown are headphone connections 438*a*, 438*b*, buttons for headphone cue-in for the channels 440, and a headphone cross-fader 442.

Additionally, with respect to a first synthesizer chipset (not visible) and a second synthesizer chipset (not visible), shown are: gate/arpeggiator buttons 444*a*, 444*b*; gate/arpeggiator indicator lights 446*a*, 446*b*; scale buttons 448*a*, 448*b*; beat per minute buttons 450*a*, 450*b*; and loop status indicators 452*a*, 452*b*.

Figure 6:
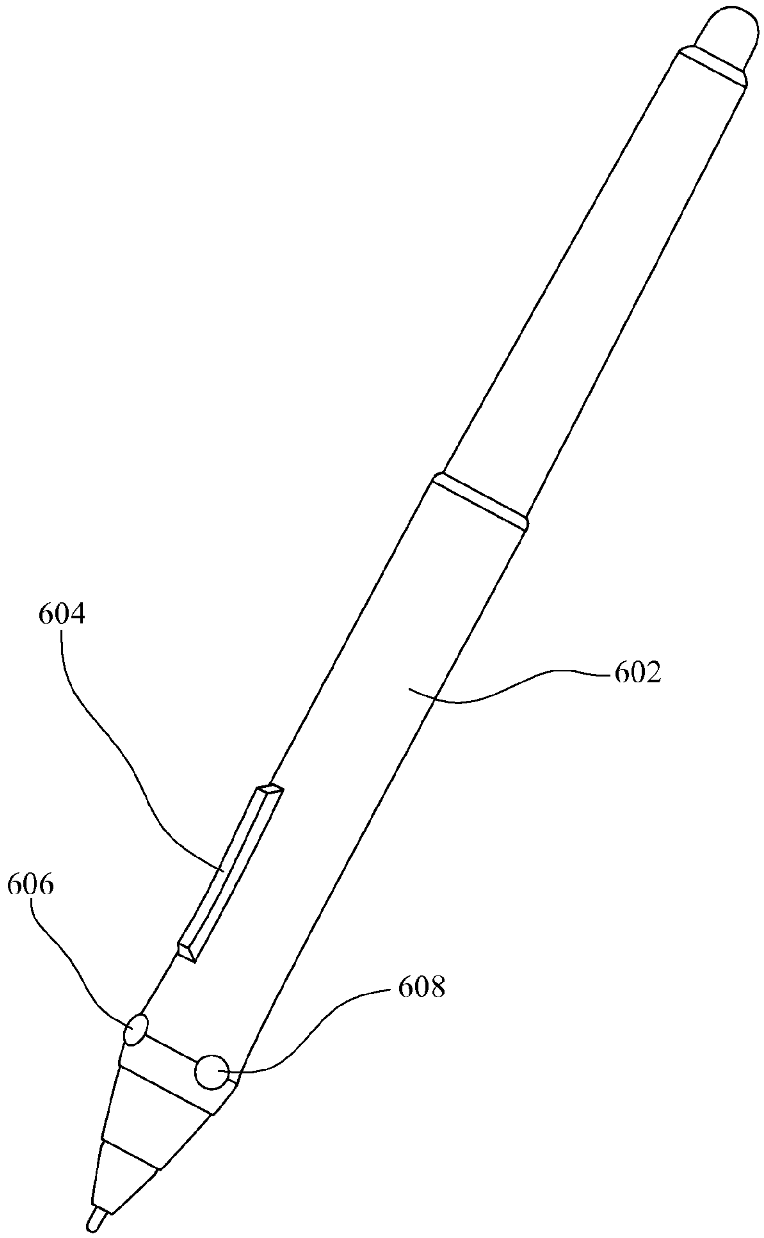
FIG. 6 is a perspective view of an exemplary embodiment of a stylus of the invention.

FIG. 6 shows an exemplary stylus 602 in the form of a pen. The exemplary stylus 602 may include, for example, tilt sensitivity and 1,024 levels of pressure sensitivity. A first button 604 on the exemplary stylus 602 may function as a mouse button. A second button 606 may function as a first integral loop function input device, and a third button 608 may function as a second integral loop function input device.

It is noted that a stylus such as described hereinabove and used with the first exemplary system 200 (FIG. 2) or the second exemplary system 300 (FIG. 3) may also take other forms, such as a mouse or even a fingertip cursor controller without departing from the spirit or the scope of the invention described and claimed herein.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". "Communication" may be by wired or wireless connection, or using any other appropriate technology. Further, the exemplary embodiments may be implemented as a process, machine, or article of manufacture using standard programming and/or engineering techniques to produce software, firmware, hardware, or any combination thereof to control a computer to implement the disclosed embodiments.

Advantageously, the system for creating and manipulating digital media described herein allows digital audio and visual media (i.e., art) to be created together, simultaneously, by a single performance DJ (i.e., artist).

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for creating and manipulating digital media, comprising:

a graphics tablet comprising a tablet surface, a grid of wires located under the tablet surface, and a graphics tablet chipset comprising:

a graphics tablet chipset interface operably connected to the grid of wires for sending power to a stylus when the stylus is positioned over the tablet surface and receiving a signal from the stylus; and a graphics tablet chipset output;

wherein the graphics tablet chipset determines a position of the stylus with respect to the tablet surface using the graphics tablet chipset interface, and outputs the position of the stylus to the graphics tablet chipset output;

a touchpad being positioned on the tablet surface such that the touchpad also detects the position of the stylus simultaneously with the graphics tablet determining the position of the stylus;

a synthesizer chipset comprising:

a synthesizer chipset input in communication with the touchpad; and a synthesizer chipset sound output;

wherein the synthesizer chipset creates digital sounds based on input from the touchpad via the synthesizer chipset input, and outputs the digital sounds to the synthesizer chipset sound output; and a computer having a graphical user interface (GUI), the GUI being in communication with the graphics tablet chipset output for receiving the position of the stylus from the graphics tablet chipset;

wherein the computer has a sound input in communication with the synthesizer chipset output for receiving the digital sounds from the synthesizer chipset, wherein the computer executes a sound manipulation software program for manipulating the digital sounds to produce manipulated digital sounds, and wherein the computer further has a sound output for outputting the manipulated digital sounds;

wherein the computer executes a drawing software program for:

creating a visual image using the position of the stylus from the graphics tablet chipset as an input to the drawing software program; and influencing characteristics of the visual image using the digital sounds from the synthesizer chipset; and wherein the computer further has a video output for outputting the visual image.

2. The system of claim 1, further comprising a housing containing the graphics tablet, the touchpad and the synthesizer chipset in a unitary assembly.

3. The system of claim 2, further comprising:

a program/value input device being integral with the housing;

a program/value display device being integral with the housing; and a loop function input device being integral with the housing; and wherein the synthesizer chipset further comprises:

a program/value input in communication with the program/value input device, for receiving a selection of one of a plurality of synthesized sound programs for creating the digital sounds;

a program/value display output in communication with the program/value display device, for displaying an indication of the selection of one of the plurality of synthesized sound programs; and a loop function input in communication with the loop function input device for receiving an instruction to stack sound phrases from at least two of the plurality of synthesized sound programs.

4. The system of claim 3, further comprising a strap having a first end and a second end, the first end and the second end attached to the housing so that the housing can be supported by a body of a user when creating the digital sounds.

5. The system of claim 1, wherein the stylus further has an integral loop function input device, and wherein the synthesizer chipset further comprises a loop function input in communication with the loop function input device for receiving an instruction to stack sound phrases from at least two of a plurality of synthesized sound programs.

6. The system of claim 1, wherein the computer has a sound input in communication with the synthesizer chipset output for receiving the digital sounds from the synthesizer chipset, wherein the computer executes a sound manipulation software program for manipulating the digital sounds to produce manipulated digital sounds, and wherein the computer further has a sound output for outputting the manipulated digital sounds.

7. The system of claim 1, wherein the computer executes a drawing software program for creating a visual image using the position of the stylus from the graphics tablet chipset as an input to the drawing software program, and wherein the computer further has a video output for outputting the visual image.

8. A system for creating and manipulating digital media, comprising:

a graphics tablet comprising a tablet surface, a grid of wires located under the tablet surface, and a graphics tablet chipset comprising:

a graphics tablet chipset interface operably connected to the grid of wires for sending power to a stylus when the stylus is positioned over the tablet surface and receiving a signal from the stylus; and a graphics tablet chipset output;

wherein the graphics tablet chipset determines a position of the stylus with respect to the tablet surface using the graphics tablet chipset interface, and outputs the position of the stylus to the graphics tablet chipset output;

a touchpad being positioned on the tablet surface such that the touchpad also detects the position of the stylus simultaneously with the determination of the position of the stylus by the graphics tablet; and a switch being interfaced to the touchpad for switching the touchpad between a first touchpad interface, a second touchpad interface, and a standby position;

a first synthesizer chipset comprising:

a first synthesizer chipset input in communication with the first touchpad interface; and a first synthesizer chipset sound output;

a second synthesizer chipset comprising:

a second synthesizer chipset input in communication with the second touchpad interface; and a second synthesizer chipset sound output;

wherein the first synthesizer chipset and the second synthesizer chipset create first synthesizer digital sounds and second synthesizer digital sounds, respectively, based on input from the touchpad via the first synthesizer chipset input and the second synthesizer chipset input, respectively, and output the first synthesizer digital sounds and the second synthesizer digital sounds to the first synthesizer chipset sound output and the second synthesizer chipset sound output, respectively; and an audio mixer comprising:

a first channel input to a first channel in communication with the first synthesizer chipset sound output;

a second channel input to a second channel in communication with the second synthesizer chipset sound output;

a mixing control; and an audio mixer output;

wherein the audio mixer mixes the first synthesizer digital sounds and the second synthesizer digital sounds via the mixing control to produce mixed digital sounds, and outputs the mixed digital sounds to the audio mixer output.

9. The system of claim 8, further comprising a housing containing the graphics tablet, the touchpad, the switch, the first synthesizer chipset, the second synthesizer chipset, and the audio mixer in a unitary assembly.

10. The system of claim 9, further comprising:

a first program/value input device being integral with the housing;

a first program/value display device being integral with the housing;

a first loop function input device being integral with the housing;

a second program/value input device being integral with the housing;

a second program/value display device being integral with the housing; and a second loop function input device being integral with the housing;

wherein the first synthesizer chipset further comprises:

a first program/value input in communication with the first program/value input device, for receiving a selection of one of a plurality of synthesized sound programs of the first synthesizer chipset for creating the first synthesizer digital sounds;

a first program/value display output in communication with the first program/value display device, for displaying an indication of the selection of one of the plurality of synthesized sound programs of the first synthesizer chipset; and a first loop function input in communication with the first loop function input device for receiving an instruction to stack sound phrases from at least two of the plurality of synthesized sound programs of the first synthesizer chipset; and wherein the second synthesizer chipset further comprises:

a second program/value input in communication with the second program/value input device, for receiving a selection of one of a plurality of synthesized sound programs of the second synthesizer chipset for creating the second synthesizer digital sounds;

a second program/value display output in communication with the second program/value display device, for displaying an indication of the selection of one of the plurality of synthesized sound programs of the second synthesizer chipset; and a second loop function input in communication with the second loop function input device for receiving an instruction to stack sound phrases from at least two of the plurality of synthesized sound programs of the second synthesizer chipset.

11. The system of claim 10, further comprising a strap having a first end and a second end, the first end and the second end attached to the housing so that the housing can be supported by a body of a user.

12. The system of claim 8, further comprising a computer having a graphical user interface (GUI), the computer being in communication with the graphics tablet chipset output, the computer receiving the position of the stylus from the graphics tablet chipset as an input to the GUI.

13. The system of claim 12, wherein the computer has a sound input in communication with the audio mixer output for receiving the mixed digital sounds from the audio mixer output, wherein the computer executes a sound manipulation software program for manipulating the mixed digital sounds to produce manipulated digital sounds, and wherein the computer further has a sound output for outputting the manipulated digital sounds.

14. The system of claim 12, wherein the computer executes a drawing software program for creating a visual image using the position of the stylus from the graphics tablet chipset as an input to the drawing software program, and wherein the computer further has a video output for outputting the visual image.

15. The system of claim 12, wherein the computer has a sound input in communication with the audio mixer output for receiving the mixed digital sounds from the audio mixer output, wherein the computer executes a sound manipulation software program for manipulating the mixed digital sounds to produce manipulated digital sounds, and wherein the computer further has a sound output for outputting the manipulated digital sounds;

wherein the computer executes a drawing software program for:

creating a visual image using the position of the stylus from the graphics tablet chipset as an input to the drawing software program; and influencing characteristics of the visual image using the mixed digital sounds from the audio mixer output; and wherein the computer further has a video output for outputting the visual image.

16. The system of claim 8, wherein the stylus further comprises a first integral loop function input device and a second integral loop function input device;

wherein the first synthesizer chipset further comprises a first loop function input in communication with the first integral loop function input device for receiving an instruction to stack sound phrases from at least two of a plurality of synthesized sound programs of the first synthesizer chipset; and wherein the second synthesizer chipset further comprises a second loop function input in communication with the second integral loop function input device for receiving an instruction to stack sound phrases from at least two of a plurality of synthesized sound programs of the second synthesizer chipset.

* * * * *